(12) United States Patent
Bledsoe et al.

(10) Patent No.: US 8,297,858 B1
(45) Date of Patent: **\*Oct. 30, 2012**

(54) MANAGING PROJECT INFORMATION WITH A HAND-PROPELLED DEVICE

(75) Inventors: James D. Bledsoe, Corvallis, OR (US); James Mealey, Corvallis, OR (US); Asher Simmons, Corvallis, OR (US)

(73) Assignee: Marvell International Ltd. (BM)

( * ) Notice: Subject to any disclaimer, the term of this patent is extended or adjusted under 35 U.S.C. 154(b) by 0 days.

This patent is subject to a terminal disclaimer.

(21) Appl. No.: 13/349,356

(22) Filed: Jan. 12, 2012

Related U.S. Application Data

(63) Continuation of application No. 12/074,123, filed on Feb. 28, 2008, now Pat. No. 8,096,713.

(51) Int. Cl.
*B41J 3/00* (2006.01)

(52) U.S. Cl. ............. 400/62; 400/88; 347/109; 358/1.5; 358/1.18

(58) Field of Classification Search ............. 400/62
See application file for complete search history.

(56) References Cited

U.S. PATENT DOCUMENTS

| | | | |
|---|---|---|---|
| 3,469,422 A | 9/1969 | Minton | |
| 4,387,579 A | 6/1983 | Branke et al. | |
| 4,714,936 A | 12/1987 | Helinski et al. | |
| 5,278,582 A | 1/1994 | Hongo | |
| 5,351,069 A | 9/1994 | Koike et al. | |
| 5,387,976 A | 2/1995 | Lesniak | |
| 5,461,680 A | 10/1995 | Davis | |
| 5,578,813 A | 11/1996 | Allen et al. | |
| 5,593,236 A | 1/1997 | Bobry | |
| 5,825,995 A | 10/1998 | Wiklof et al. | |
| 5,861,877 A | 1/1999 | Kagayama et al. | |
| 5,927,872 A | 7/1999 | Yamada | |
| 5,930,466 A | 7/1999 | Rademacher | |
| 6,000,946 A | 12/1999 | Snyders et al. | |
| 6,030,582 A | 2/2000 | Levy | |
| 6,217,017 B1 | 4/2001 | Yamazaki | |
| 6,312,124 B1 | 11/2001 | Desormeaux | |
| 6,332,677 B1 | 12/2001 | Steinfield et al. | |
| 6,348,978 B1 | 2/2002 | Blumer et al. | |
| 6,357,939 B1 | 3/2002 | Baron | |
| 6,384,921 B1 | 5/2002 | Saijo et al. | |
| 6,390,249 B2 | 5/2002 | Tachibana | |
| 6,467,870 B2 | 10/2002 | Matsumoto et al. | |
| 6,517,266 B2 | 2/2003 | Saund | |

(Continued)

FOREIGN PATENT DOCUMENTS

AU    2006252324    1/2007

(Continued)

OTHER PUBLICATIONS

International Search Report and Written Opinion mailed Jul. 28, 2008 for International Application No. PCT/US2008/55636.

(Continued)

*Primary Examiner* — Jill Culler

(57) ABSTRACT

A hand-propelled printer/scanner is disclosed for use in updating a project document, such as any diagram, schematic, floor plan, or other document. The project document is updated with revision drawings and/or notes printed by the hand-propelled printer/scanner directly on an existing project document. The hand-propelled printer/scanner is sized for single hand use and is moved about on the project document for printing the revisions and notes. A position module provides absolute position data so that the revisions and notes are printed at the correct locations on the existing document. Use of the hand-propelled printer/scanner allows project documents to be updated on the job site, as an example.

20 Claims, 10 Drawing Sheets

U.S. PATENT DOCUMENTS

| | | |
|---|---|---|
| 6,580,244 B2 | 6/2003 | Tanaka et al. |
| 6,682,190 B2 | 1/2004 | Rasmussen et al. |
| 6,773,177 B2 | 8/2004 | Denoue et al. |
| 6,789,869 B2 | 9/2004 | Takeishi |
| 6,851,878 B2 | 2/2005 | Hemmerlin |
| 6,896,349 B2 | 5/2005 | Valero et al. |
| 6,933,889 B1 | 8/2005 | Wolf et al. |
| 6,942,335 B2 | 9/2005 | Trent |
| 6,951,778 B2 | 10/2005 | Akhavain et al. |
| 6,952,284 B2 | 10/2005 | Andrews et al. |
| 7,013,029 B2 | 3/2006 | Keskar et al. |
| 7,038,712 B1 | 5/2006 | Livingston et al. |
| 7,108,370 B2 | 9/2006 | Breton |
| 7,184,167 B1 | 2/2007 | Ito et al. |
| 7,200,560 B2 | 4/2007 | Philbert |
| 7,336,388 B2 | 2/2008 | Breton |
| 7,410,100 B2 | 8/2008 | Muramatsu |
| 7,627,189 B2 | 12/2009 | Donomae et al. |
| 7,679,604 B2 | 3/2010 | Uhlik et al. |
| 7,808,450 B2 | 10/2010 | Wanda et al. |
| 7,812,994 B2 | 10/2010 | Carlson et al. |
| 7,853,298 B2 | 12/2010 | Kakumaru |
| 7,929,019 B2 | 4/2011 | Ohmura et al. |
| 7,949,370 B1 | 5/2011 | Bledsoe et al. |
| 7,988,251 B2 | 8/2011 | Dimitrijevic et al. |
| 8,000,740 B1 | 8/2011 | Bledsoe et al. |
| 8,077,350 B1 | 12/2011 | Simmons et al. |
| 8,079,765 B1 | 12/2011 | Bledsoe et al. |
| 8,083,422 B1 | 12/2011 | Simmons et al. |
| 2002/0154186 A1 | 10/2002 | Matsumoto |
| 2003/0043388 A1 | 3/2003 | Andrews et al. |
| 2003/0150917 A1 | 8/2003 | Tsikos et al. |
| 2003/0152679 A1 | 8/2003 | Garwood |
| 2004/0021912 A1 | 2/2004 | Tecu et al. |
| 2004/0252051 A1 | 12/2004 | Johnson |
| 2005/0001867 A1 | 1/2005 | Akase |
| 2006/0012660 A1 | 1/2006 | Dagborn |
| 2006/0050131 A1 | 3/2006 | Breton |
| 2006/0061647 A1 | 3/2006 | Breton |
| 2006/0279784 A1 | 12/2006 | Carlson et al. |
| 2007/0009277 A1 | 1/2007 | Shoen |
| 2007/0023582 A1 | 2/2007 | Steele et al. |
| 2007/0080494 A1 | 4/2007 | Marshall et al. |
| 2007/0150194 A1 | 6/2007 | Chirikov |
| 2008/0007762 A1 | 1/2008 | Robertson et al. |
| 2008/0123126 A1 | 5/2008 | Harris |
| 2008/0144053 A1 | 6/2008 | Gudan et al. |
| 2008/0204770 A1 | 8/2008 | Bledsoe et al. |
| 2008/0211848 A1 | 9/2008 | Mealy et al. |
| 2008/0211864 A1 | 9/2008 | Mealy et al. |
| 2008/0212118 A1 | 9/2008 | Mealy et al. |
| 2008/0212120 A1 | 9/2008 | Mealy et al. |
| 2008/0213018 A1 | 9/2008 | Mealy et al. |
| 2008/0215286 A1 | 9/2008 | Mealy et al. |
| 2008/0262719 A1 | 10/2008 | Bledsoe et al. |
| 2009/0034018 A1 | 2/2009 | Lapstun et al. |
| 2009/0279148 A1 | 11/2009 | Lapstun et al. |
| 2010/0039669 A1 | 2/2010 | Chang et al. |
| 2010/0231633 A1 | 9/2010 | Lapstun et al. |

FOREIGN PATENT DOCUMENTS

| | | |
|---|---|---|
| EP | 0655706 | 5/1995 |
| EP | 1209574 | 5/2002 |
| EP | 1 543 981 | 6/2005 |
| EP | 1 543981 A3 | 7/2006 |
| JP | 11058844 | 3/1999 |
| JP | 2001-301235 | 10/2001 |
| JP | 2002-307756 | 10/2002 |
| JP | 2005-270484 | 10/2005 |
| JP | 2006-527355 | 11/2006 |
| JP | 2006-341604 | 12/2006 |
| JP | 2007-013021 | 1/2007 |
| WO | WO 03/055689 A1 | 7/2003 |
| WO | WO 03/076196 A1 | 9/2003 |
| WO | WO 03/076197 | 9/2003 |
| WO | WO03076196 | 9/2003 |
| WO | WO 2004/056577 A1 | 7/2004 |
| WO | WO 2004/088576 | 10/2004 |
| WO | WO 2005/070684 A1 | 8/2005 |

OTHER PUBLICATIONS

GB Search Report for GB Application No. 0610837.7, dated Oct. 31, 2006, 2 pages.
HP Ink Jet Printer Cartridge Anatomy, http://wandel.ca.hp45_anatomy/index.html, printed Apr. 19, 2007, pp. 1-8.
U.S. Appl. No. 12/036,862, entitled, "Print Head Configuration for Hand-Held Printing", filed Feb. 25, 2008, 32 pages.
U.S. Appl. No. 12/039,491 entitled, "Cap Design for an Inkjet Print Head With Hand-Held Imaging Element Arrangement With Integrated Cleaning Mechanism", filed Feb. 28, 2008. 38 paqes.
U.S. Appl. No. 12/041,466 entitled, "Ink Supply for a Hand-Held Ink Jet Printer", filed Mar. 3, 2008, 38 paqes.
U.S. Appl. No. 11/955,209, filed Dec. 12, 2007, Bledsoe et al.
U.S. Appl. No. 11/955,258, filed Dec. 12, 2007, Simmons et al.
U.S. Appl. No. 11/955,027, filed Dec. 18, 2007, Simmons et al.
U.S. Appl. No. 11/972,462, filed Jan. 10, 2008, Simmons et al.
U.S. Appl. No. 12/013,313, filed Jan. 11, 2008, Bledsoe et al.
U.S. Appl. No. 12/016,833, filed Jan. 18, 2008, Simmons et al.
U.S. Appl. No. 12/083,660, filed Feb. 27, 2008, McKinley et al.
U.S. Appl. No. 12/188,056, filed Aug. 7, 2008, Mealy et al.
Fairchild, "IEEE 1284 Interface Design Solutions," Jul. 1999, Fairchild Semiconductor, AN-5010, 10 pages.
Texas Instruments, "Program and Data Memory Controller," Sep. 2004, SPRU577A, 115 pages.
U.S. Appl. No. 11/955,228, filed Dec. 12, 2007, Bledsoe et al.
U.S. Appl. No. 11/955,240, filed Dec. 12, 2007, Bledsoe et al.
U.S. Appl. No. 11/968,528, filed Jan. 2, 2008, Simmons et al.
U.S. Appl. No. 12/037,043, filed Feb. 25, 2008, Bledsoe et al.
U.S. Appl. No. 12/037,029, filed Feb. 25, 2008, Bledsoe et al.
U.S. Appl. No. 12/041,496, filed Mar. 8, 2008, Mealy et al.
U.S. Appl. No. 12/941,545, filed Mar. 3, 2008, Mealy et al.
U.S. Appl. No. 12/041,535, filed Mar. 3, 2008, Mealy et al.
U.S. Appl. No. 12/062,472, filed Apr. 3, 2008, McKinley et al.

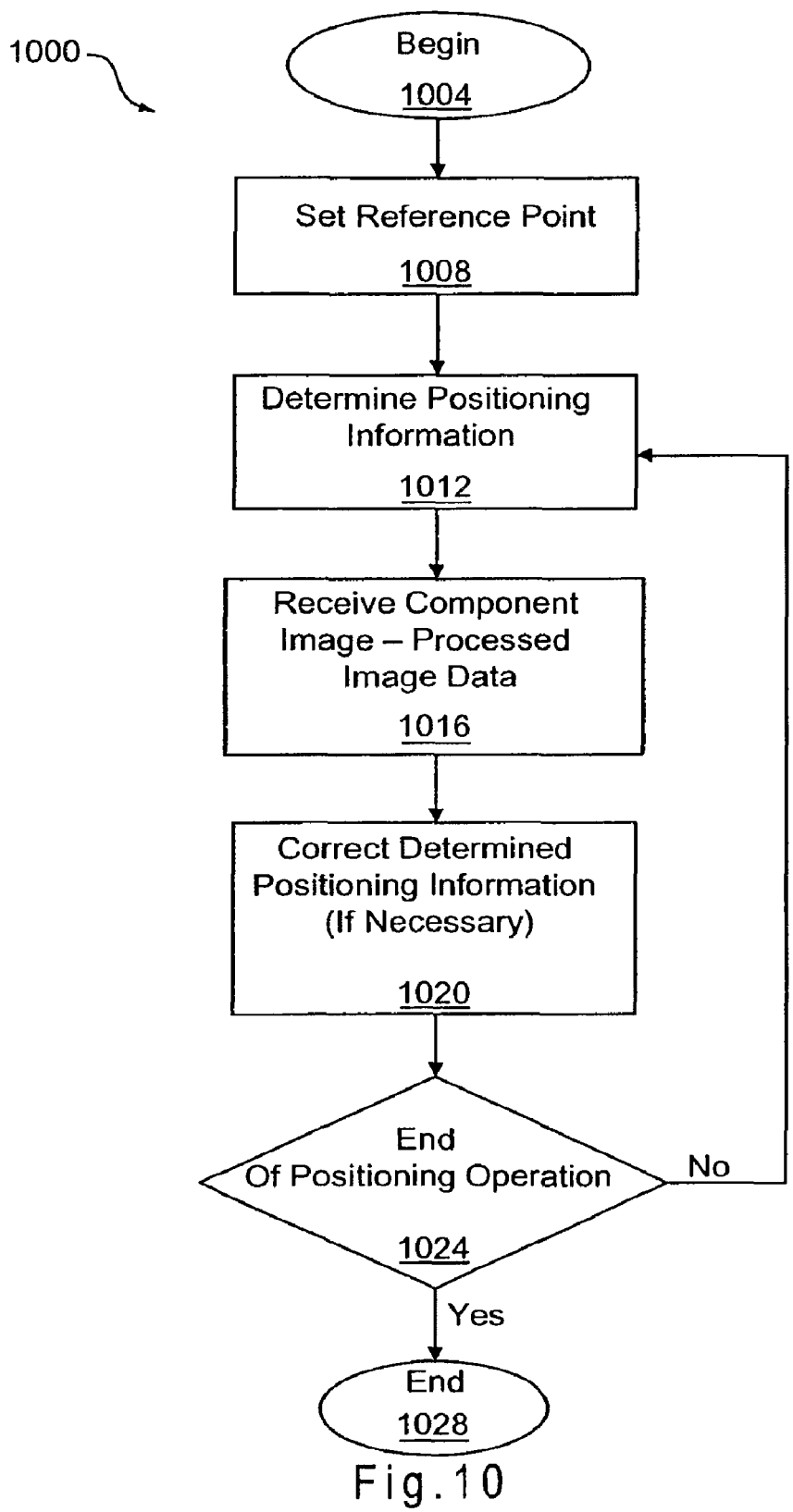

MANAGING PROJECT INFORMATION WITH A HAND-PROPELLED DEVICE

RELATED APPLICATION

This application is a continuation of U.S. patent application Ser. No. 12/074,123, filed Feb. 28, 2008, which is hereby incorporated by reference in its entirety. This application claims the benefit of U.S. Provisional Application No. 60/892,713, filed on Mar. 2, 2007, which is incorporated herein by reference.

BACKGROUND

1. Technical Field

The present disclosure relates to the field of project information management, and more particularly to facilitating the communication of instructions, diagrams, revisions, notes, and/or other information pertaining to a project.

2. Related Art

Many industries utilize project documents in the planning, development, building, and/or maintenance stages of systems and objects, including houses, buildings, facilities, devices, and many other products. A project document may be any diagram, schematic, floor plan, layout, specification, instruction set, or other type of document that describes components and/or provides dimensions, positions, connections and/or other relationships between the components that comprise the product. A project document is often a working document, meaning that changes made to the product are reflected as revisions to the document. Ideally, when a project participant makes a change to the product, the project document is revised and reprinted for distribution to all of the project participants. Often, managing document change (i.e., ensuring that when a change is made, everyone involved receives an updated project document) is vital for cost effectively completing the project.

The construction industry is an example of an industry in which managing document change is critical. A construction project is managed through a set of approved project documents (hereinafter "plans"). The approved set of plans are often many pages of large sheets of paper printed by a large format printer. Each project participant (e.g., master carpenter, master plumber, master electrician, landscaper, etc.) receives a copy of the set of plans.

As the project progresses, it is not unusual for a project participant to make a change to their area of the construction project and make revisions to their own set of plans. The revisions are often made by handwritten notations or sketches on the set of plans in their possession. Project participants also often annotate their respective sets of plans with information related to the required changes to their and/or other areas of the project, problems that were discovered, solutions implemented, and many other types of instructions and notes. Ideally, plan revisions are collected and communicated to other project participants by way of issuing new sets of plans (revisions) to all of the project participants.

The task of tracking revision numbers and ensuring that all project participants are working off the same, latest version of plans at any given time is often costly and can be difficult to achieve. For example, project participants may be reluctant to handover their set of plans if they contain annotations or other notes. Project participants may also be burdened with having to copy their annotations/notes from a former set of plans to a reissued set of plans. Differences in delivery dates/times of revised plan sets to all of the different participants can cause delays and problems that affect everyone. Also, printing multiple revised plan sets and delivering them to the project participants can be costly and a source of error. An improved approach is desirable.

BRIEF SUMMARY

The following embodiments relate to updating a project document with a hand-propelled printer (or printer/scanner combination). The hand-propelled printer receives image data for printing project updates, including revisions and/or other information, directly on an existing project document that may be in the possession of a project participant at any location, such as at a job site. Updating the project document with the hand-propelled printer not only serves to communicate the updates to the project participant, but also allows the project participant to continue to work off of the same, existing project document.

In a preferred embodiment, a hand-propelled printer has a position module and a processor. The position module determines position data of the hand-propelled printer in response to movement on a project document. The position data includes the location and the orientation of the hand-propelled printer relative to an origin and an initial orientation. The processor receives image data corresponding to updates to the project document and generates print data based on the image data and the position data. The processor communicates the print data to a print mechanism for printing updates on the project document as the hand-propelled printer is moved about the surface of the project document. The updates may include revisions to elements in the project document, instructions, remarks, annotations, and/or notes. The hand-propelled printer may also have a wireless interface to communicate with a host for receiving the image data.

In a version, the print mechanism includes a plurality of nozzles arranged in rings around a sensor element. The ring-shaped nozzle arrangement allows the hand-propelled printer to print as it is moved in any direction on a project document. The sensor element may comprise part of a scan head. The processor may be configured to determine a reference point of the project document based on scan data received from the scan head.

The position module may have a movement module to generate movement data in response to movement of the hand-propelled printer. The movement data indicates the location and the orientation of the hand-propelled printer relative to the origin and the initial orientation. The position module may also have two motion sensors to communicate motion signals to the movement module in response to movement of the hand-propelled printer. In a preferred version, a position module processor receives the movement data and determines the position data. The position data includes location and orientation data indicative of a position of the hand-propelled printer.

The hand-propelled printer may have a housing having a length of approximately five inches, a width of approximately two inches, and a height of approximately one inch.

Other systems, methods, and features of the invention will be, or will become, apparent to one with skill in the art upon examination of the following figures and detailed description. It is intended that all such additional systems, methods, features and advantages be included within this description, be within the scope of the invention, and be protected by the following claims.

The preferred embodiments will now be described with reference to the attached drawings.

BRIEF DESCRIPTION OF THE DRAWINGS

FIG. 10 shows acts of a positioning operation of a handheld printing and scanning device in accord with various embodiments of the present invention;

DETAILED DESCRIPTION OF THE PRESENTLY PREFERRED EMBODIMENTS

The invention can be better understood with reference to the following drawings and description. The components in the figures are not necessarily to scale, emphasis instead being placed upon illustrating the principles of the invention. Moreover, in the figures, like referenced numerals designate corresponding parts or elements throughout the different views.

The embodiments below relate to a hand-propelled printer/scanner for use in managing project information. The hand-propelled printer/scanner receives image data from a host or other device. The image data corresponds to revision data that relates to updates, including revisions and/or other information, that are to be printed directly on an existing version of a project document. The hand-propelled printer/scanner has a position module to maintain image alignment as the hand-propelled printer/scanner is moved about the project document to print the updates. Project document updates are thereby provided to project participants by way of overprinting existing project documents, allowing the project participants to maintain possession and continue to work off of the existing project documents.

Figure 1:
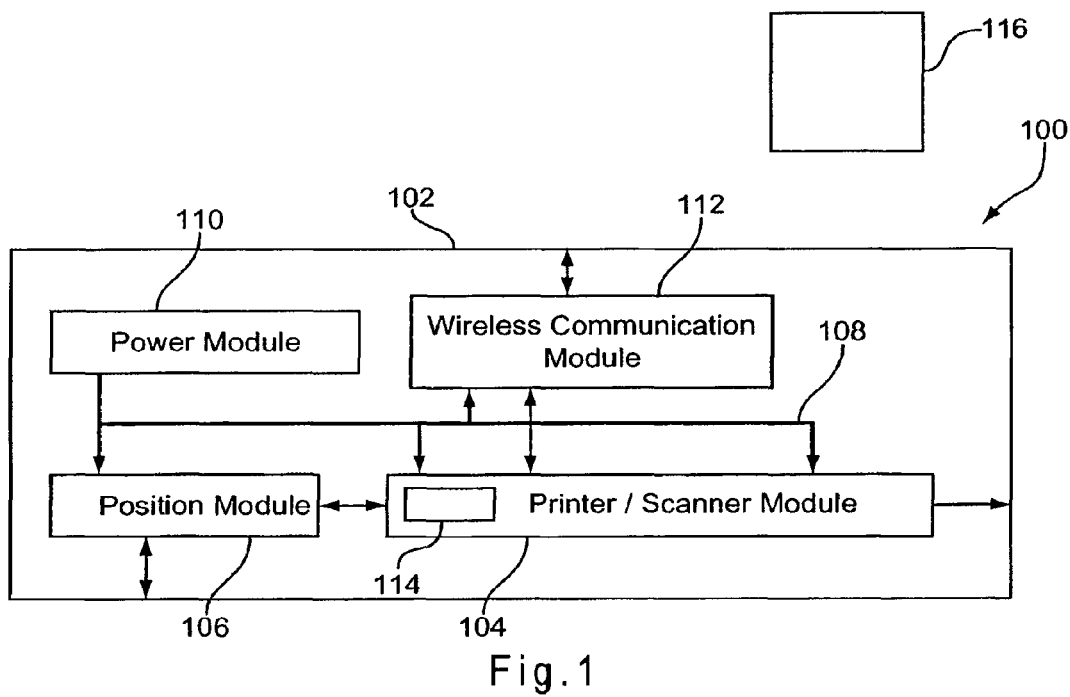
FIG. 1 is a diagram of a system that includes a version of a hand-propelled printer/scanner for use in managing project documents and information in accord with an embodiment of the invention.

FIG. 1 is a diagram of a system 100 that includes a hand-propelled device 102 and a host 116 for use in managing project documents and information in accord with an embodiment of the invention. The hand-propelled device 102 may be a handheld printer, a handheld scanner, or a combination handheld printer/scanner, as examples, and will be referred to as a "device" throughout the specification.

In a preferred embodiment, the device 102 has a printer/scanner module 104 having a module processor 114 for executing printing and/or scanning functions. The device 102 preferably includes a data bus 108, a power module 110, and a wireless communication module 112 to communicate with a host 116 or other device. The device 102 may also or alternatively have a communication port (not shown) for establishing a physical connection to the host 116 or other device. It is to be understood that any data discussed hereinafter as communicated by way of the wireless communication module 112 may be communicated by way of a physical connection with the device 102.

The device 102 is preferably handheld and hand-propelled, having dimensions suitable for single hand movement and control. In one version, the dimensions of the housing of the device 102 are approximately five inches in length, two inches in width, and one inch in height. It is to be understood that the device may be any shape or size suitable for hand-propulsion.

If the device 102 is a hand-propelled printer or printer/scanner, the wireless communication module 112 receives image data, such as a bitmap, from the host 116 and communicates the image data to the module processor 114. The host 116 generates the image data based on revision data pertaining to the project document. The revision data may be any type of information pertaining to the project. For example, the revision data may indicate that a doorway is to be relocated several feet from its location shown in an existing project document. Image data is generated base on the revision data. In this example, the image data would include plan elements that, when printed on the existing project document, show the doorway at its updated location (preferably printed with an ink color that is different than the ink color of the doorway as shown in its previous location). Thus, the revision data corresponds to one or more updates that are to be printed directly on an existing project document by the device 102. The existing project document may be a previously issued plan that is currently being used in the field, as an example.

As discussed above, the update(s) may include revisions and information. A revision may indicate that a wall is to be constructed at a different location than previously indicated. A revision may indicate that wiring or plumbing is to follow a route that is different than that shown in the existing project document. In a schematic, the revision may indicate wiring changes and/or changes to components. It is to be understood that the revision(s) may indicate any type of change (including, but not limited to, adding, eliminating, substituting, or relocating parts) to any type of project, system, object, or component of the project. Because the revision is printed on an existing project document, the project participant does not have to surrender the document. Once the revision(s) are printed on the project document, it may be considered an up-to-date project document with a designated version number.

The updates may also include information such as instructions, remarks, annotations, notes, or other information (collectively "information") to be printed on the existing project document. The information may be based on information or data communicated from a project participant, supplier, government entity, or other source, as examples. The computer or other programming device (such as host 116) generates image data based on the information and communicates the image data to the device 102. The device 102 is used to print the information on the project document as part of a revision or update. The information may be printed by the device 102 on the existing project document in the form of handwritten (image) or formatted, stylistic font, as examples.

Updates may be printed with the same or different colored ink and/or line style than that which already exists on a project document. For example, if a first plumbing route is printed in black ink, a revised plumbing route may be printed in red ink for a first revision, in blue ink for a second revision, and so on. Information may be textual or symbolic instructions, such as for updating component specifications and/or indicating any other changes to the project document. The textual or symbolic instructions may be printed in the same or a different colored ink and/or line style than that which already exists on the project document. Preferably, a new version number is printed on the project document as part of every update.

To print updates (i.e., revisions and/or information) on a project document, the device 102 is placed on the project document. The device 102 may be placed at a designated, initial location in a designated, initial orientation so that the updates are accurately aligned and positioned with the existing document image. Alternatively, or in addition, the device 102 may utilize a scanning function (discussed below) to locate an existing mark or structure on the project document. The existing mark or structure may be used by the device 102 as a reference point or object for positioning and aligning the printed updates.

As an operator moves the device 102 about the surface of the project document, the updates are printed on the project document in accord with the image data. If the project document is large, the device 102 may be moved about the project document along different paths so that updates can be completed over all applicable areas. The paths need not be linear or follow a predetermined pattern because the device 102 includes a position module 106 for determining the absolute position of the print head as it is moved in any direction to any location with respect to a designated starting point or, alternatively, reference point. Thus, the device 102 selectively prints the updates at the correct locations as it is moved about the surface of the project document while it continuously determines its position. The device preferably provides an audio or visual signal to the operator when the updates have been completely printed on the project document.

As mentioned above, the device 102 includes a position module 106 for determining its location and orientation as it is moved about the project document. The position module 106 provides location and orientation data to the module processor 114. The module processor 114 determines print data based on the image data and location and orientation data received from the position module 106. The module processor 114 communicates the print data to a print mechanism as the device 102 is moved about the surface of the project document. The print mechanism renders the updates on the project document based on the print data.

If the device 102 is a hand-propelled scanner or printer/scanner, notes and annotations added to a project document may be scanned into the device 102 and stored as image or text data. The data may be communicated to a host 116 or other device for use in the project. For example, a notation made by a project participant on a project document may indicate a change in construction schedule, a change in parts used, a request, contact information, and/or any other type of information. The notation may be scanned into the device 102 and processed and/or communicated as data to a project manager and/or any other project participant for possible use as revision data, for reference, and/or for record keeping purposes.

Annotations made by project participants on project documents may also be scanned in and communicated to other devices. An annotation may indicate that wiring or plumbing is to follow a route that is different than that shown by the existing project document or that a wall is to be constructed at a different location than previously indicated. In a schematic, an annotation may indicate wiring changes and/or changes to components, as examples. The notes and annotations may be communicated directly or through the host 116 to other devices, such as personal digital assistants (PDAs). For example, the notes and annotations may be communicated to the host 116 for transmission via facsimile, e-mail, text message, or other mode of communicating information. The notes and annotations may be used as revision data from which image data may be generated and communicated back to the device 102 and other devices by the host 116. The notes and annotations may be used by an operator of the host 116 to program updates for printing by the device 102 as part of a revision to a project document. The notes and annotations may also be stored in a database for future reference or for any other purpose. For example, if numerous revisions have caused a hard copy to be illegible, a new project document may be printed (via the large format printer) and redistributed. The new project document would include all of the hand annotations that were previously captured and stored.

For scanning notes and annotations, the device 102 is placed on and moved about the surface of a project document as an imaging mechanism generates image signals. The module processor 114 receives the image signals from the imaging mechanism and determines image data based on the image signals and location and orientation data received from the position module 106. The module processor 114 communicates the image data to the wireless communication module 112, which communicates the image data to the host 116. The host 116 may be a desktop or laptop computer, or other device that communicates (sends/receives) image data. The wireless communication module 112 and the host 116 may comprise a network such as a wireless local area network (WLAN), as an example.

Figure 2:
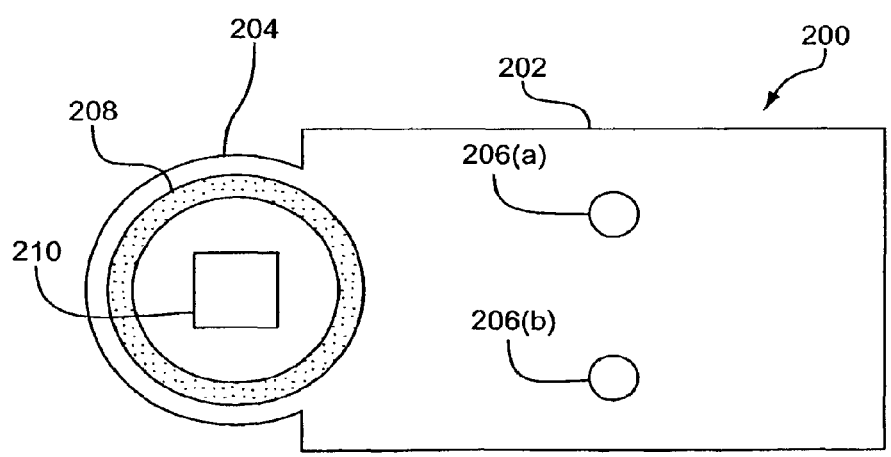
FIG. 2 is a bottom plan view of the hand-propelled printer/scanner of FIG. 1.

FIG. 2 is an illustration of an embodiment of the printing/scanning side (underside) 202 of a hand-propelled printer/scanner device ("device") 200. The device 200 has two motion sensors 206(a) and 206(b) and an imaging mechanism 204. The imaging mechanism 204 includes a print head 208 and a scan head 210. The print head 208 is circular having a plurality of nozzles for dispensing ink. Because the print head is circular, ink may be deposited by the device 200 as it is moved in any direction. In one version, the print head 208 deposits ink along a one-third inch wide print path as the device is moved. In other versions, the print path may be greater or less than one-third inch. As the device 200 is moved about the project document, the motion sensors 206(a) and 206(b) generate motion signals for determining the absolute position of the print head 208 or scan head 210. This aspect of the device 200 is discussed in greater detail below with reference to the position module 106.

Figure 3A:
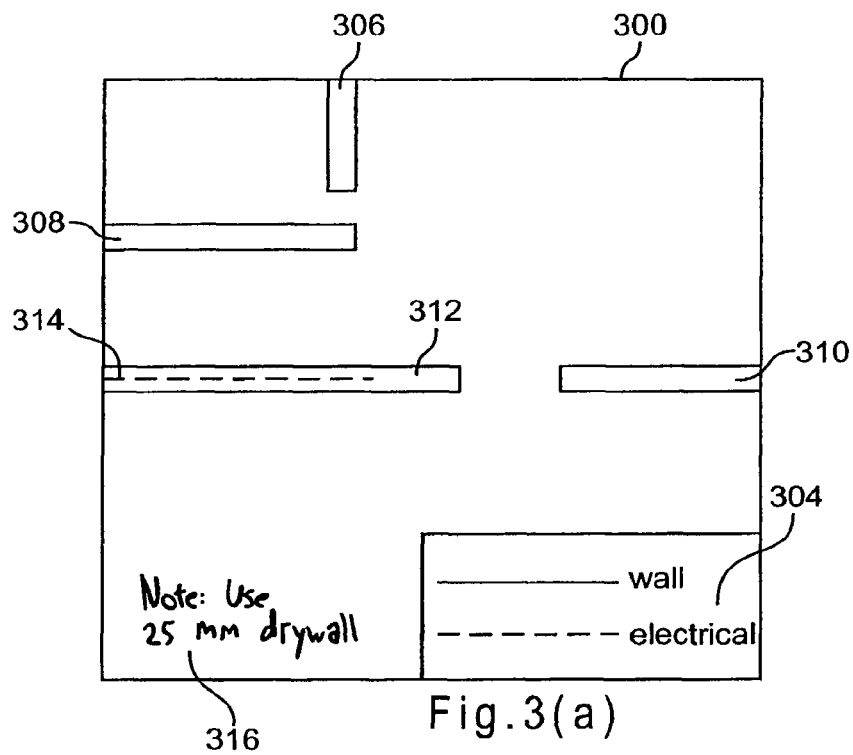
FIGS. 3(a) and 3(b) illustrate an example of project information management using the hand-propelled printer/scanner of FIG. 1.
Figure 3B:
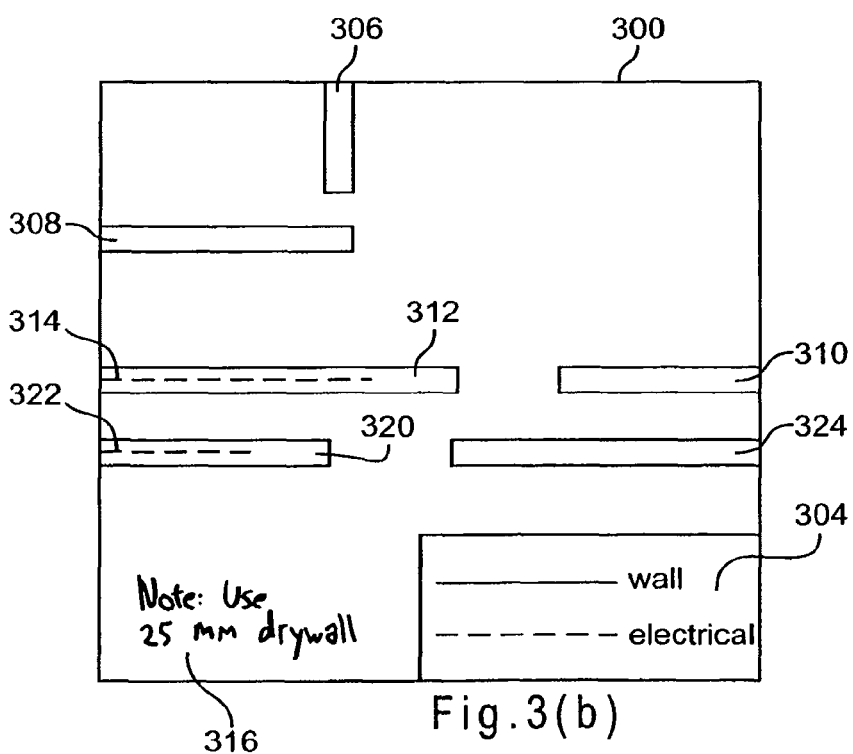

FIGS. 3(a) and 3(b) illustrate an example of project information management using a hand-propelled printer/scanner. FIG. 3(a) shows an initial version of a project document 300. The project document 300 includes a legend 304 that indicates that walls are represented by solid lines and that electrical wiring is represented by dashed lines. Four walls 306, 308, 310, and 312 are shown. Electrical wiring 314 runs through about half of the length of wall 312. The project document 300 also includes a handwritten note 316 to use 25 mm drywall. A hand-propelled printer/scanner, such as shown in FIGS. 1 and 2, may be used to scan the note 316 to generate image data. The image data of the note 316 may be communicated to project participants and/or a host or other device for use as project information. The image data may also be stored in a main project tracking database for future reference and project documentation.

FIG. 3(*b*) shows the same copy of the project document 300 shown in FIG. 3(*a*), with revisions added by a hand-propelled printer. Because the hand-propelled printer adds updates to an existing project document, everything that is shown in FIG. 3(*a*) is shown in FIG. 3(*b*). However, FIG. 3(*b*) also shows the updates (in this example revisions are shown) added by the hand-propelled printer. The revisions show that wall 312 has been relocated and resized to wall 320; electrical wiring 322 has been moved and resized accordingly; and wall 310 has been moved and resized to wall 324. The revisions may be printed in the same or different colored ink/line style as the initial walls and electrical wiring.

Figure 4:
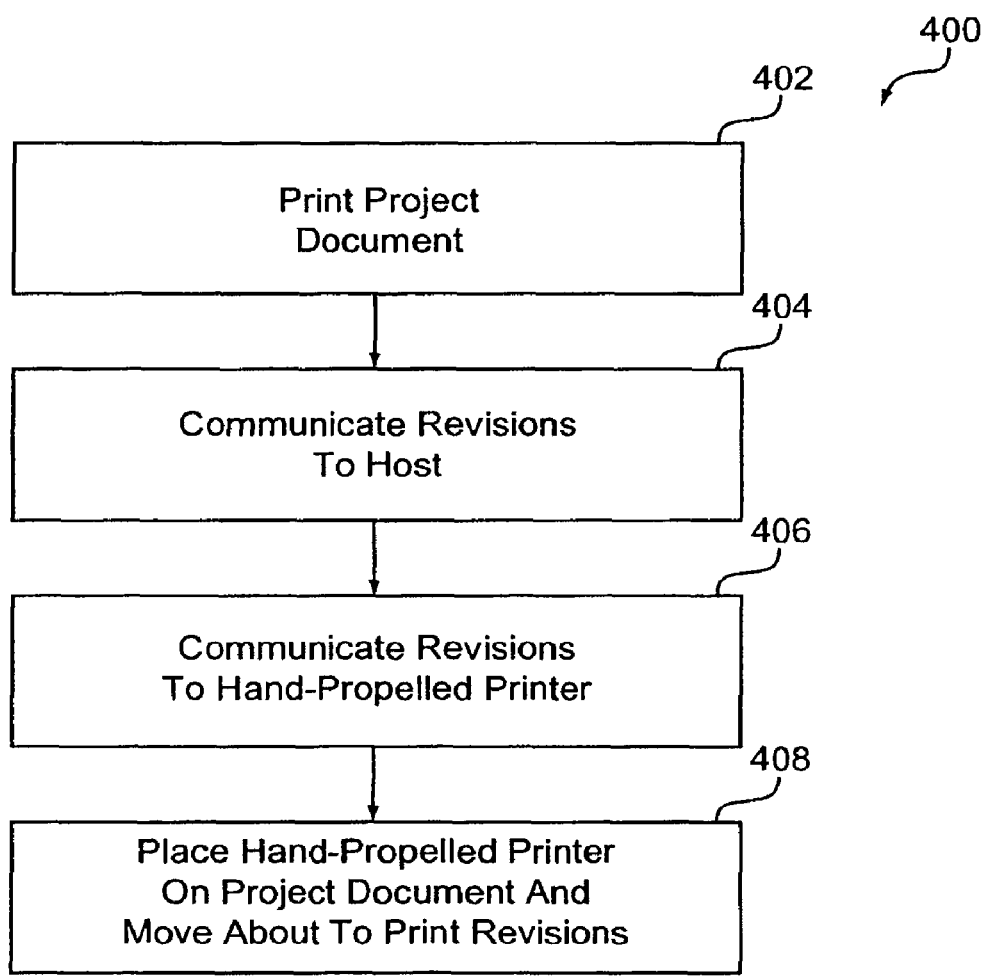
FIG. 4 shows acts for managing project information in accord with an embodiment of the invention.

FIG. 4 shows acts (400) for managing project information in accord with an embodiment of the invention. A project document is printed (Act 402). Revisions are communicated to a host or other device configured to communicate image data to a hand-propelled printer (Act 404). The revisions may include drawing and/or instruction additions and/or changes, or any other type of update discussed above. The host/device communicates the revisions, as image data, to the hand-propelled printer (Act 406). The host device may communicate the revisions wirelessly or by physical connection to the hand-propelled printer. The hand-propelled printer is placed on the project document and moved about to print the revisions directly on the project document (Act 408). The hand-propelled printer prints the revisions based on image and positioning data.

Figure 5:
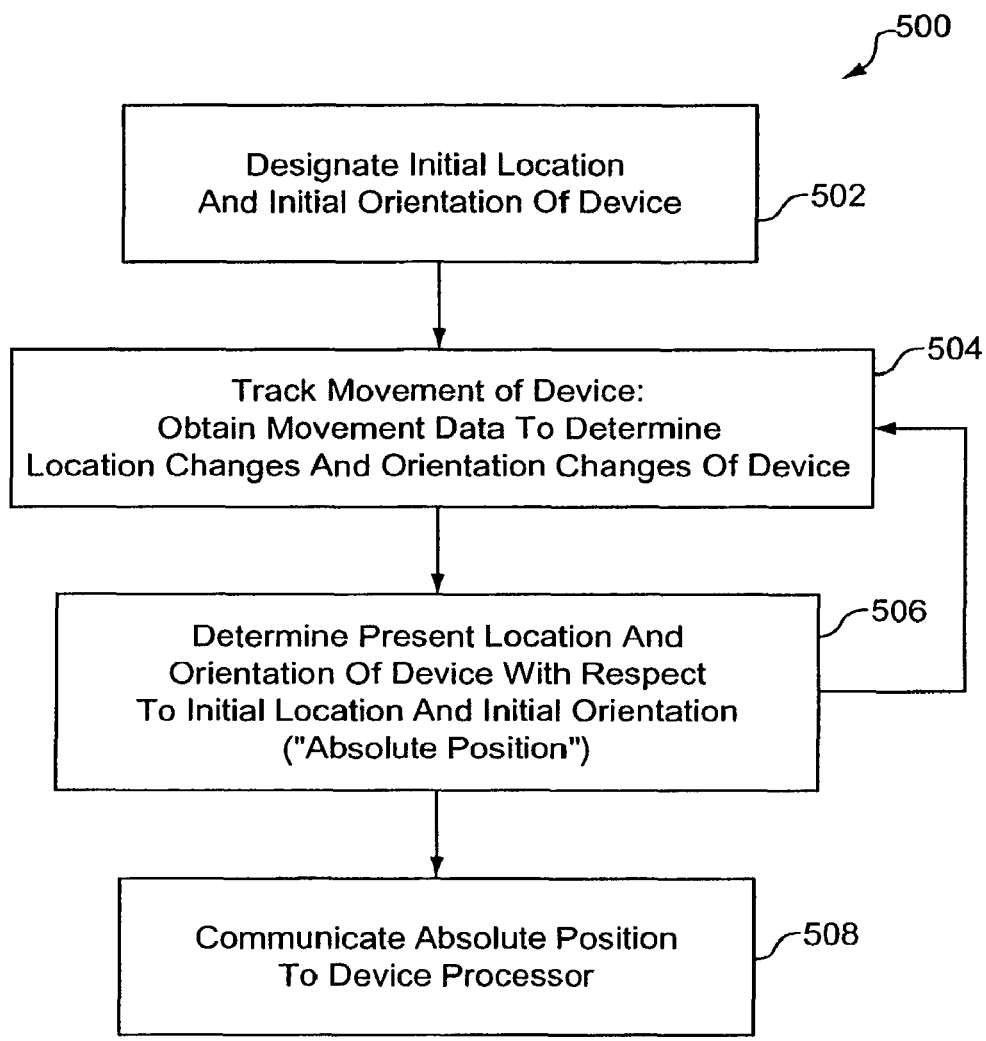
FIG. 5 shows acts for determining the location and orientation of a hand-propelled printer/scanner with reference to an initial position as the printer/scanner is moved.

FIG. 5 shows acts 500 for determining the position of a device, such as a hand-propelled printer and/or scanner, with reference to an initial position as the device is moved about on a project document. The position of the device is defined by the device's location and orientation. The location of the device may be represented by any point defined within or on the device, such as a center-point or by an area of the device such as a print head or scan head. The orientation of the device is defined as an angle relative to an initial device orientation.

In one embodiment, the device is set at a position that is designated the initial position or "origin" of the device. The origin includes an initial location and initial orientation of the device on the project document before the device is moved (Act 502). The act of designating an initial location and an initial orientation of the device may be referred to as "zeroing the origin." The initial location and initial orientation may be defined within any two or three dimensional coordinate system. In one implementation, the device is set at the top-left corner of the project document, with the top edge of the device aligned with the top edge of the project document and the left edge of the device aligned with the left edge of the project document.

As the device is moved, movement data is generated to track location changes and orientation changes of the device (Act 504). The movement data may be generated by any component, module, or any mechanism that generates data indicative of movement.

Figure 6:
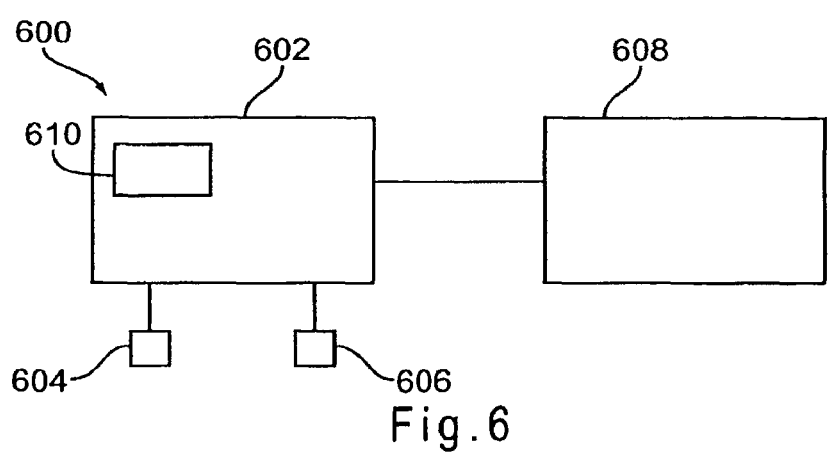
FIG. 6 is a block diagram of an embodiment of a position module for determining the location and orientation of a hand-propelled printer/scanner with reference to an initial position.

FIG. 6 shows an embodiment of a position module 600 that generates movement data. The position module 600 includes a movement module 602 and a processor 608. The movement module 602 includes two motion sensors 604 and 606. The motion sensors 604, 606 may be optical motion sensors such as light-emitting diode (LED) and complementary medal-oxide semiconductor (CMOS) sensor pairs. Each CMOS sensor captures hundreds of images per second as is moves. The movement module 602 includes a movement module processor 610 to receive the images from the motion sensors 604, 606. The movement module processor 610 detects patterns in each image and compares the patterns in successive images to determine movement direction and distance of each CMOS sensor. In alternate versions, the motion sensors 604, 606 may be track-ball motion sensors, laser motion sensors, inertial motion sensors, or other type of motion sensors that generate movement signals. The movement module processor 610 may be any hardware, software, or firmware based processor.

Direction and distance data is generated for both motion sensors 604, 606 as the device moves. For example, as motion sensor 604 moves from point A to point B and motion sensor 606 moves from point M to point N, direction and distance data is generated by the movement module 602 for each sensor 604, 606. The location of motion sensor 604 with respect to point A and the location of motion sensor 606 with respect to point M is determined by the movement module 602 based on the direction and distance data generated for each respective sensor 604, 606. When motion sensor 604 next moves from point B to point C, the movement module 602 determines the location of motion sensor 204 with respect to point B. Likewise, when motion sensor 606 moves from point N to point O, the movement module 602 determines the location of motion sensor 606 with respect to point N. The movement module 602 generates movement data indicative of the movement of each motion sensor 604, 606 from point-to-point and communicates the movement data to the processor 608.

The processor 608 determines the position of the device with respect to the origin (the initial location and initial orientation of the device) by cumulating the movement data received from the movement module 602 (Act 506). The position of the device determined by the processor 608 includes both the location and orientation of the device with respect to the origin and may be referred to as the "absolute position" of the device.

The location of the device (or any point, line, or area of the device) is determined by cumulating the movement data, starting from the origin. The orientation of the device is defined as an angle between two lines: the first line is defined by the locations of the two motion sensors when the device is at the origin; the second line is defined by the locations of the two motion sensors when the device is at its respective location. As movement data continues to be received from the movement module 602 as the device moves, the processor 608 continues to update the absolute position of the device. The absolute position of the device may be communicated as location and orientation data to a device processor for use in printing an image or text on the project document or for generating scan data from an image scanned from the project document (Act 508).

Figure 7:
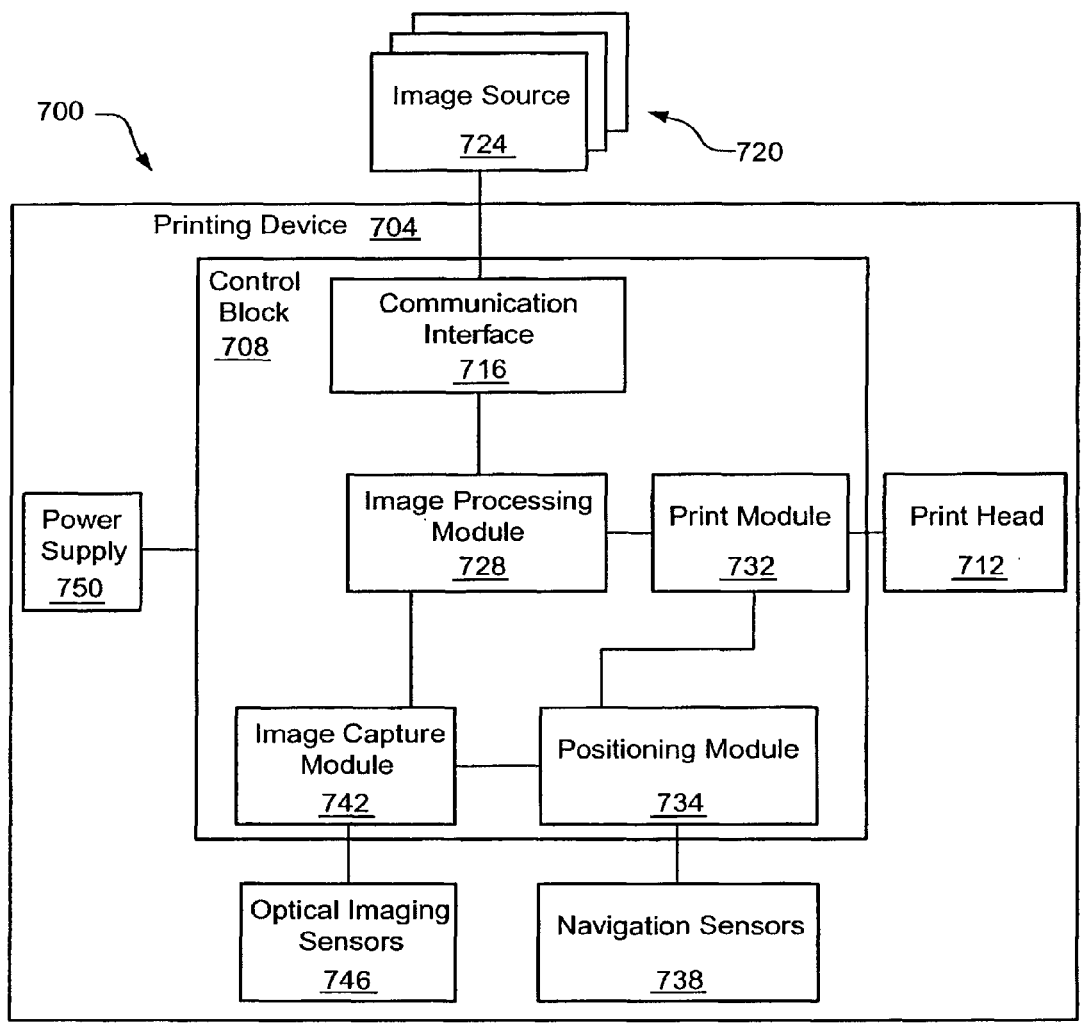
FIG. 7 is a schematic of a system that includes a version of a handheld printing and scanning device for use in managing project documents and information in accord with an embodiment of the invention.

FIG. 7 is a schematic of a system 700 that includes a handheld printing and scanning device 704, hereinafter "printing device" 704, for use in managing project documents and information in accord with embodiments of the invention. The printing device 704 includes a control block 708 having components designed to facilitate precise and accurate positioning of a print head 712 throughout an entire printing and/or scanning operation to a project document. The use of positioning data provides for reliable image production, through printing, and image acquisition, through scanning, with a mobile and versatile hand-propelled printing device 704.

The control block 708 has a communication interface 716 configured to communicatively couple the control block 708 to other devices 720, which may include an image source 724.

The image source 724 may be any type of device capable of transmitting data related to an image or text to be printed. The image source 724 may include a general purpose computing device, e.g., a desktop computing device, a laptop computing device, a mobile computing device, a personal digital assistant, a cellular phone, etc. or it may be a removable storage device, e.g., a flash memory data storage device, designed to store data such as image data. If the image source 724 is a removable storage device, e.g., a universal serial bus (USB) storage device, the communication interface may include a port, e.g., USB port, designed to receive the storage device.

The communication interface 716 may include a wireless transceiver to allow the communicative coupling with the image source 724 to take place over a wireless link. The image data may be wirelessly transmitted over the link through the modulation of electromagnetic waves with frequencies in the radio, infrared or microwave spectrums.

A wireless link may contribute to the mobility and versatility of the printing device 704. However, the printing device 704 may additionally/alternatively include a wired link communicatively coupling one or more of the other devices 720 to the communication interface 716.

In some versions of the printing device 704, the communication interface 716 communicates with the other devices 720 through one or more wired and/or wireless networks including, but not limited to, personal area networks, local area networks, wide area networks, metropolitan area networks, etc. The data transmission may be done in a manner compatible with any of a number of standards and/or specifications including, but not limited to, 802.11, 802.16, Bluetooth®, Global System for Mobile Communications (GSM), code-division multiple access (CDMA), Ethernet, etc.

The communication interface 716 transmits the received image data to an on-board image processing module 728. The image processing module 728 processes the received image data in a manner to facilitate an upcoming printing process. Image processing techniques may include dithering, decompression, half-toning, color plane separation, and/or image storage. In various embodiments some or all of these image processing operations may be performed by the image source 724 or another device. The processed image may then be transmitted to a print module 732 where it is cached in anticipation of a print operation.

The print module 732 may also receive positioning information, indicative of a position of the print head 712 relative to a reference point, from a positioning module 734. The positioning module 734 may be communicatively coupled to one or more navigation sensors 738. The navigation sensors 738 may include a light source, e.g., LED, a laser, etc., and an optoelectronic sensor designed to take a series of pictures of a print medium adjacent to the printing device 704 as the printing device 104 is moved over the print medium (i.e., project document). The positioning module 734 processes the pictures provided by the navigation sensors 738 to detect structural variations of the print medium. The movement of the structural variations in successive pictures indicates motion of the printing device 704 relative to the medium. The precise positioning of the navigation sensors 738 can be determined by tracking the movement of the structural variations. The navigation sensors 738 may be maintained in a structurally rigid relationship with the print head 712, thereby allowing for the calculation of the precise location of the print head 712.

The print medium, as used in embodiments herein, may be any type of medium on which a printing substance, e.g., ink, powder, etc., may be deposited. It is not limited to printed paper or other thin, flexible print media commonly associated with traditional printing devices.

The navigation sensors 738 have operating characteristics for tracking movement of the printing device 704 within a desired degree of precision. In one example, the navigation sensors 738 process approximately 1500 frames per second, with each frame including a rectangular array of 18×18 pixels. Each pixel detects a six-bit grayscale value, e.g., capable of sensing 64 different levels of gray.

The print module 732 receives the positioning information and coordinates the location of the print head 712 to a portion of the processed image and a corresponding location on the print medium. The print module 732 controls the print head 712 to deposit a printing substance on the print medium to render the corresponding portion of the processed image.

The print head 712 may be an inkjet print head having a plurality of nozzles designed to emit liquid ink droplets. The ink, which may be contained in reservoirs/cartridges, may be black and/or any of a number of various colors. A common, full-color inkjet print head may have nozzles for cyan, magenta, yellow, and black ink. Other embodiments may utilize other printing techniques, e.g., toner-based printers such as laser or light-emitting diode (LED) printers, solid ink printers, dye-sublimation printers, inkless printers, etc.

The control block 708 may also include an image capture module 742. The image capture module 742 is communicatively coupled to one or more optical imaging sensors 746. The optical imaging sensors 746 may include a number of individual sensor elements. The optical imaging sensors 746 may be designed to capture a plurality of surface images of the print medium, which may be individually referred to as component surface images. The image capture module 742 generates a composite image by stitching together the component surface images. The image capture module 742 receives positioning information from the positioning module 734 to facilitate the arrangement of the component surface images into the composite image.

In an embodiment in which the printing device 704 is capable of scanning full color images, the optical imaging sensors 746 have sensor elements capable of scanning different colors.

A composite image acquired by the printing device 704 may be transmitted to one or more of the other devices 720 by, e.g., e-mail, fax, file transfer protocols, etc. The composite image may be additionally/alternatively stored locally by the printing device 704 for subsequent review, transmittal, printing, etc.

In addition (or as an alternative) to composite image acquisition, the image capture module 742 may be utilized for calibrating the positioning module 734. In various embodiments, the component surface images (whether individually, some group, or collectively as the composite image) may be compared to the processed print image rendered by the image processing module 728 to detect accumulated positioning errors and/or to reorient the positioning module 734 in the event the positioning module 734 loses track of its reference point. This may occur, for example, if the printing device 704 is lifted off the print medium during a print operation.

The printing device 704 may include a power supply 750 coupled to the control block 708. The power supply 750 may be a mobile power supply, e.g., a battery, a rechargeable battery, a solar power source, etc. In other embodiments the power supply 750 may additionally/alternatively regulate power provided by another component (e.g., one of the other devices 720, a power cord coupled to an alternating current (AC) outlet, etc.).

Figure 8:
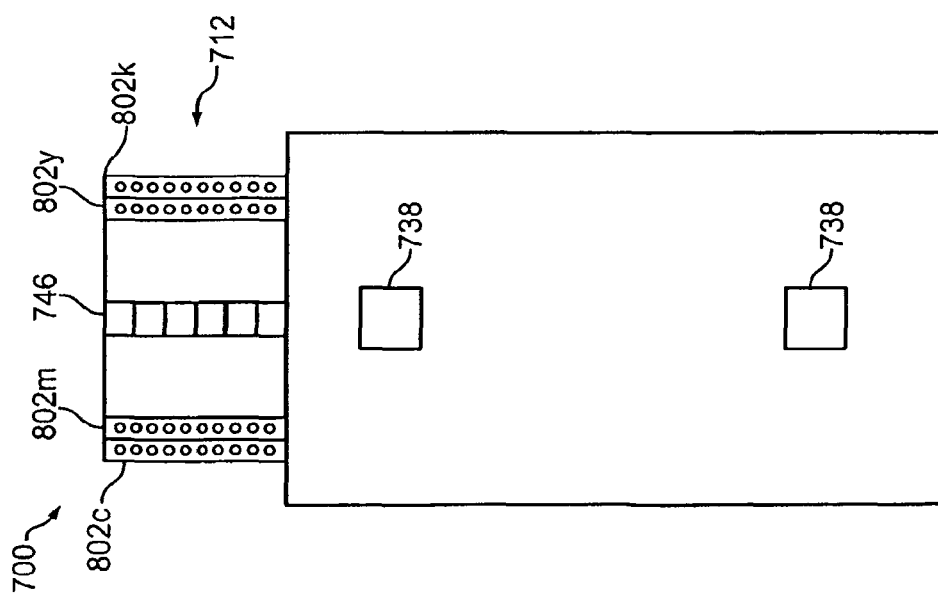
FIG. 8 is a bottom plan view of the handheld printing and scanning device of FIG. 7.

FIG. 8 is a bottom plan view of the printing device 704 of FIG. 7. The printing device 704 includes two navigation sensors 738, a plurality of optical imaging sensors 746, and a print head 712.

As discussed above, the navigation sensors 738 communicate image data to the positioning module 734, which determines positioning information related to the optical imaging sensors 746 and/or the print head 712. As stated above, the proximal relationship of the optical imaging sensors 746 and/or print head 712 to the navigation sensors 738 may be fixed to facilitate the positioning of the optical imaging sensors 746 and/or print head 712 through information obtained by the navigation sensors 738.

The print head 712 may be an inkjet print head having a number of nozzle rows for different colored inks. In particular, and as shown in FIG. 8, the print head 712 may have a nozzle row 802c for cyan-colored ink, a nozzle row 802m for magenta-colored ink, a nozzle row 802y for yellow-colored ink, and nozzle row 802k for black-colored ink. The nozzle rows of the print head 712 may be arranged around the optical imaging sensors 746. This may allow for the optical imaging sensors 746 to capture information about the ink deposited on the print medium, which represents the processed image in various formative stages, for the predominant side-to-side motion of the printing device 704.

In various embodiments the placement of the nozzles of the print head 712 and the sensor elements of the optical imaging sensors 746 may be further configured to account for the unpredictable nature of movement of the hand-propelled printing device 704. For example, while the nozzles and sensor elements are arranged in linear arrays in the printing device 704 other embodiments may arrange the nozzles and/or sensor elements in other patterns. In some embodiments, the nozzles may be arranged completely around the sensor elements so that whichever way the printing device 704 is moved the optical imaging sensors 746 will capture component images reflecting deposited ink. In some embodiments, the nozzles may be arranged in rings around the sensor elements (e.g., concentric circles, nested rectangular patterns, etc.).

While the nozzle rows 802c, 802m, 802y, and 802k shown in FIG. 8 are arranged in rows according to their color, other embodiments may intermix the different colored nozzles in a manner that may increase the chances that an adequate amount of appropriate colored ink is deposited on the print medium through the natural course of movement of the printing device 704 over the print medium.

In the embodiment depicted by FIG. 8, the linear dimension of the optical imaging sensors 746 may be similar to the linear dimension of the nozzle rows of the print head 712. The linear dimensions may refer to the dimensions along the major axis of the particular component, e.g., the vertical axis of the optical imaging sensors 746 as shown in FIG. 8. Having similar linear dimensions may provide that roughly the same amount of passes over a print medium are required for a complete scan and print operation. Furthermore, having similar dimensions may also facilitate the positioning calibration as a component surface image captured by the optical imaging sensors 746 may correspond to deposits from an entire nozzle row of the print head 712.

Figure 9:
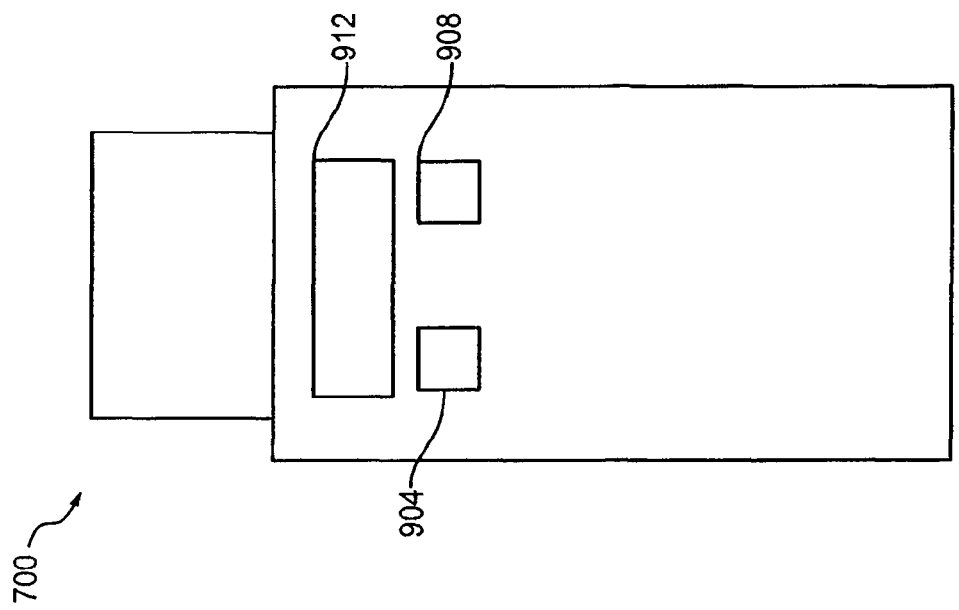
FIG. 9 is a top plan view of the handheld printing and scanning device of FIG. 7.

FIG. 9 is a top plan view of the printing device 704 of FIG. 7. The printing device 704 may have a variety of user input/outputs to provide the functionality enabled through use of the printing device 704. Some examples of input/outputs that may be used to provide some of the basic functions of the printing device 704 include, but are not limited to, a print control input 904 to initiate/resume a print operation, a scan control input 308 to initiate/resume a scan operation, and a display 912.

The display 912, which may be a passive display, an interactive display, etc., may provide the user with a variety of information. The information may relate to the current operating status of the printing device 704 (e.g., printing, ready to print, scanning, ready to scan, receiving print image, transmitting print image, transmitting scan image, etc.), power of the battery, errors (e.g., scanning/positioning/printing error, etc.), instructions (e.g., "position device over a printed portion of the image for reorientation," etc.). If the display 912 is an interactive display it may provide a control interface in addition to, or as an alternative from, the control inputs 904 and 908.

FIG. 10 shows acts 1000 of a positioning operation of the printing device 704 in accordance with various embodiments of the present invention. A positioning operation may begin with an initiation of a scanning or a printing operation, e.g., by activation of the print control input 904 or the scan control input 908 (Act 1004). The positioning module 734 within the printing device 704 may set a reference point (Act 1008). The reference point may be set when the printing device 704 is placed onto a print medium at the beginning of a print or scan job. This may be ensured by the user being instructed to activate the control input once the printing device 704 is in place and/or by the proper placement of the printing device 704 being treated as a condition precedent to instituting the positioning operation. In some embodiments the proper placement of the printing device 704 may be automatically determined through the navigation sensors 738, the optical imaging sensors 746, and/or some other sensors (e.g., a proximity sensor).

Once the reference point is set, the positioning module 734 determines positioning information, e.g., translational and/or rotational changes from the reference point, using the navigation sensors 738 (Act 1012). The translational changes may be determined by tracking incremental changes of the positions of the navigation sensors along a two-dimensional coordinate system, e.g., $\Delta x$ and $\Delta y$. Rotational changes may be determined by tracking incremental changes in the angle of the printing device with respect to either the x-axis or the y-axis. These transitional and/or rotational changes may be determined by the positioning module 734 comparing consecutive navigational images taken by the navigation sensors 738 to detect these movements.

The positioning module 734 may also receive component surface images from the optical imaging sensors 746 and processed image data from the image processing module (Act 1016). If the positioning information is accurate, a particular component surface image from a given location should match a corresponding portion of the processed image. If the given location is one in which the print head 712 has deposited something less than the target print volume for the location, the corresponding portion of the processed image may be adjusted to account for the actual deposited volume for comparison to the component surface image. In the event that the print head 712 has yet to deposit any material in the given location, the positioning information may not be verified through this method. However, the verification of the positioning information may be done frequently enough given the constant movement of the printing device 704 and the physical arrangement of the nozzle rows of the print head 712 in relation to the optical imaging sensors 746.

If the particular component surface image from the given location does not match the corresponding portion of the processed image, the positioning module 734 may correct the determined positioning information (Act 1020). Given adequate information, e.g., sufficient material deposited in the location captured by the component surface image, the positioning module 734 may set the positioning information to the offset of the portion of the processed image that matches the component surface image. In most cases this may be an identified pattern in close proximity to the location identified by the incorrect positioning information. In the event that the pattern captured by the component surface image does not identify a pattern unique to the region surrounding the incorrect positioning information, multiple component surface images may be combined in an attempt to identify a unique pattern. Alternatively, correction may be postponed until a component surface image is captured that does identify a pattern unique to the surrounding region.

In some embodiments, correction of the determined positioning information may be done periodically in order to avoid overburdening the computational resources of the positioning module 734.

Following correction, the positioning module 734 determines whether the positioning operation is complete (Act 1024). If it is determined that the positioning operation is not yet complete, the operation loops back (to Act 1012). If it is determined that it is the end of the positioning operation, the operation ends (Act 1028). The end of the positioning operation may be tied to the end of the printing/scanning operation, which will be discussed with reference to FIGS. 11 and 12, respectively.

Figure 11:
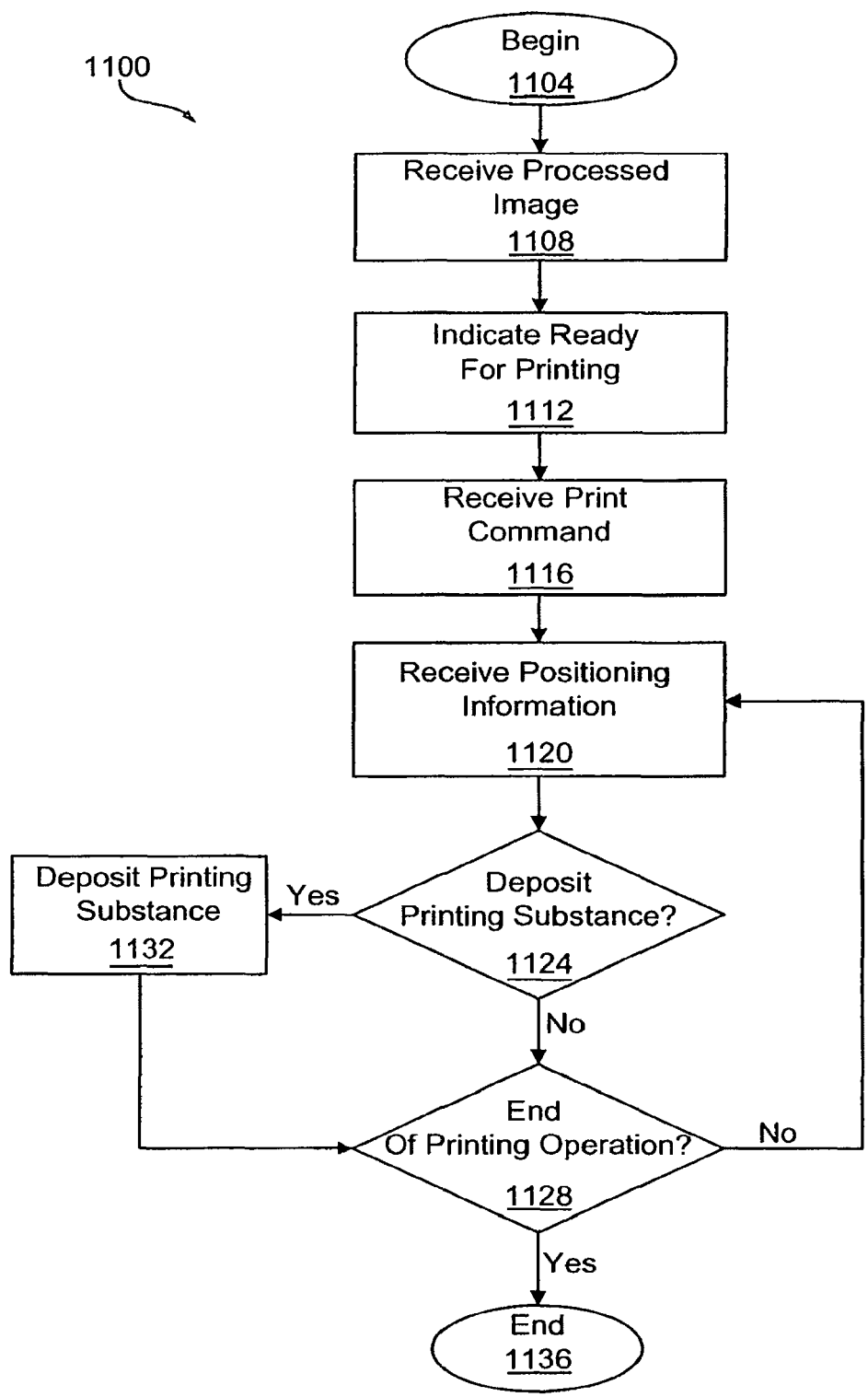
FIG. 11 shows acts of a printing operation implemented by the handheld printing and scanning device of FIG. 7.

FIG. 11 shows acts 1100 of a printing operation of the printing device 704 in accord with various embodiments of the present invention. The printing operation may begins (Act 1104) and the print module 732 receives a processed image from the image processing module 728 (Act 1108). Upon receipt of the processed image, the display 912 indicates that the printing device 704 is ready for printing (Act 1112).

The print module 732 receives a print command generated from a user activating the print control input 904 (Act 1116). The print module 732 receives positioning information from the positioning module 734 (Act 1120). The print module 732 determines whether to deposit printing substance at the given position (Act 1124). The determination as to whether to deposit printing substance may be a function of the total drop volume for a given location and the amount of volume that has been previously deposited.

If it is determined that no additional printing substance is to be deposited, the operation may advance to determine whether the end of the print operation has been reached (Act 1128). If it is determined that additional printing substance is to be deposited, the print module 732 causes an appropriate amount of printing substance to be deposited by generating and transmitting control signals to the print head 712 that cause the nozzles to drop the printing substance (Act 1132).

The determination of whether the end of the printing operation has been reached may be a function of the printed volume versus the total print volume. In some embodiments the end of the printing operation may be reached even if the printed volume is less than the total print volume. For example, an embodiment may consider the end of the printing operation to occur when the printed volume is ninety-five percent of the total print volume. However, it may be that the distribution of the remaining volume is also considered in the end of print analysis. For example, if the five percent remaining volume is distributed over a relatively small area, the printing operation may not be considered to be completed.

In some embodiments, an end of print job may be established by a user manually cancelling the operation.

If it is determined that the printing operation has been completed, the printing operation ends (Act 1136).

If it is determined that the printing operation has not been completed, the printing operation loops back (to Act 1120).

Figure 12:
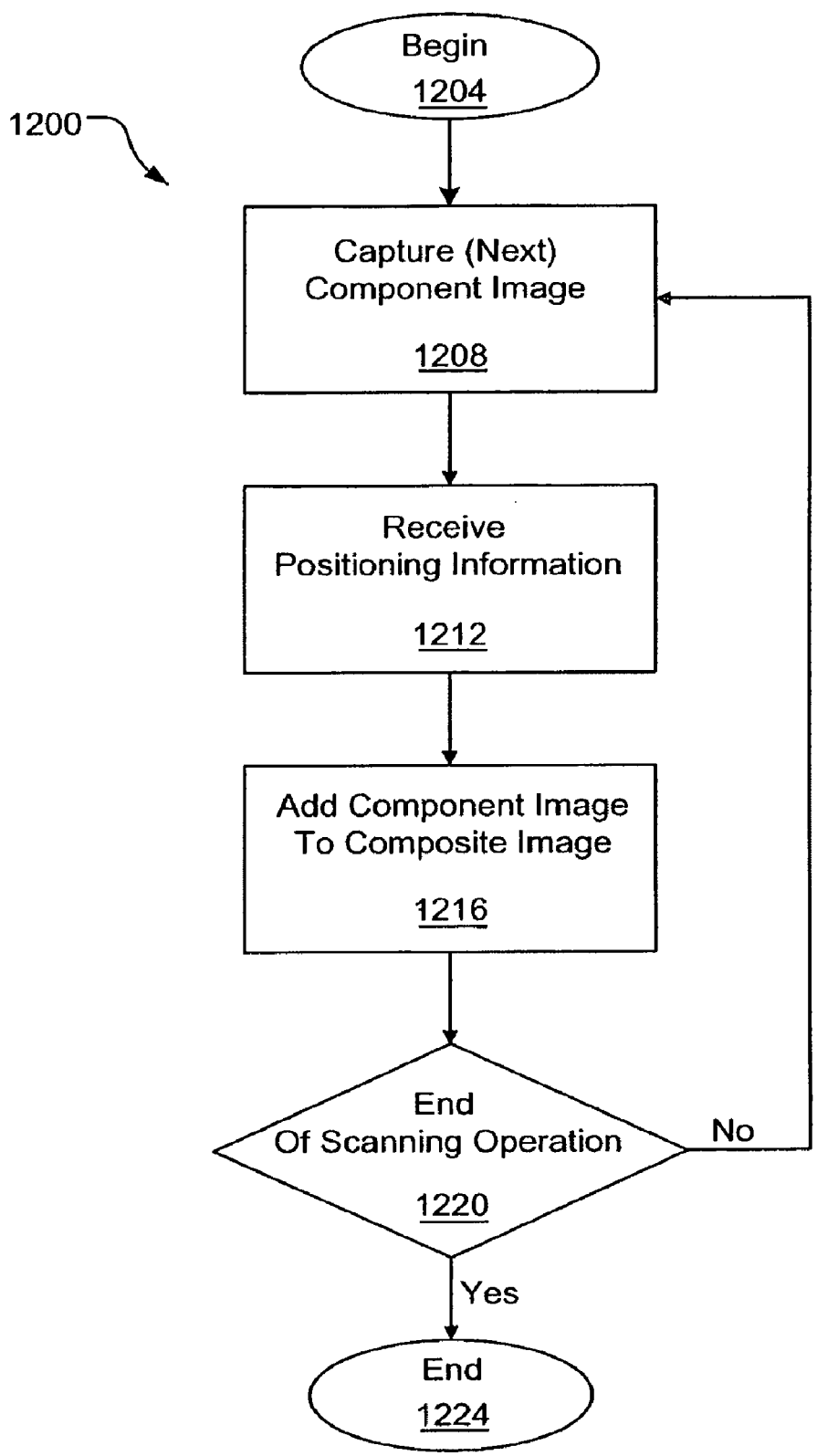
FIG. 12 shows acts of a scanning operation implemented by the handheld printing and scanning device of FIG. 7.

FIG. 12 shows acts 1200 of a scanning operation of the printing device 704 for use in managing project documents and information in accord with an embodiment of the invention. The scanning operation begins with the receipt of a scan command generated from a user activating the scan control input 908 (Act 1204).

The image capture module 742 controls the optical imaging sensors 746 to capture one or more component images (Act 1208). In some embodiments, the scan operation will only commence when the printing device 704 is placed on a print medium. This may be ensured by manners similar to those discussed above with respect to the printing operation, e.g., by instructing the user to initiate scanning operation only when the printing device 704 is in place and/or automatically determining that the printing device 704 is in place.

The image capture module may receive positioning information from the positioning module (Act 1212) and add the component images to the composite image (Act 1216). The image capture module determines whether the scanning operation is complete (Act 1220).

The end of the scanning operation may be determined through a user manually cancelling the operation and/or through an automatic determination. In some embodiments, an automatic determination of the end of print job may occur when all interior locations of a predefined image border have been scanned. The predefined image border may be determined by a user providing the dimensions of the image to be scanned or by tracing the border with the printing device 704 early in the scanning sequence.

If it is determined that the scanning operation has been completed, the scanning operation ends (Act 1224).

If it is determined that the scanning operation has not been completed, the scanning operation loops back (to Act 1208).

Figure 13:
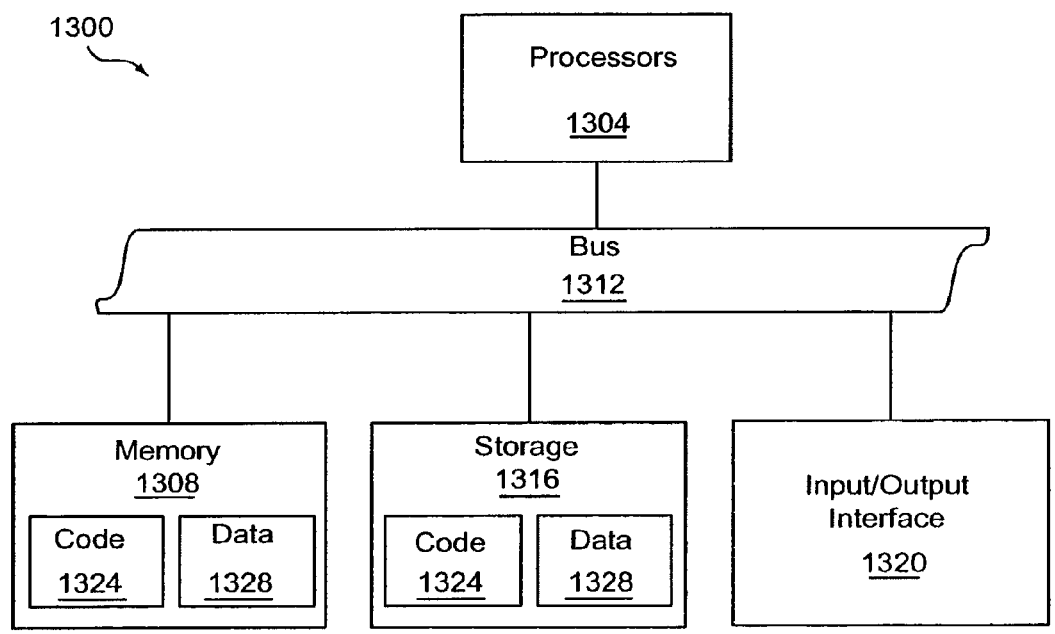
FIG. 13 illustrates a version of a computing device that implements the control block of the handheld printing and scanning device of FIG. 7.

FIG. 13 illustrates a version of a computing device 1300 implementing a control block, e.g., control block 708. Computing device 1300 includes one or more processors 1304, memory 1308, and bus 1312, coupled to each other as shown. Additionally, computing device 1300 includes storage 1316, and one or more input/output interfaces 1320 coupled to each other, and the earlier described elements as shown. The components of the computing device 1300 may be designed to provide the printing, scanning, and/or positioning functions of a control block of a printing device as described herein.

Memory 1308 and storage 1316 may include, in particular, temporal and persistent copies of code 1324 and data 1328, respectively. The code 1324 may include instructions that when accessed by the processors 1304 result in the computing device 1300 performing operations as described in conjunction with various modules of the control block in accordance with embodiments of this invention. The processing data 1328 may include data to be acted upon by the instructions of the code 1324. In particular, the accessing of the code 1324 and data 1328 by the processors 1304 may facilitate printing, scanning, and/or positioning operations as described herein.

The processors 1304 may include one or more single-core processors, multiple-core processors, controllers, application-specific integrated circuits (ASICs), etc.

The memory 1308 may include random access memory (RAM), dynamic RAM (DRAM), static RAM (SRAM), synchronous DRAM (SDRAM), dual-data rate RAM (DDRRAM), etc.

The storage 1316 may include integrated and/or peripheral storage devices, such as, but not limited to, disks and associated drives (e.g., magnetic, optical), USB storage devices and associated ports, flash memory, read-only memory (ROM), non-volatile semiconductor devices, etc. Storage 1316 may be a storage resource physically part of the computing device 1300 or it may be accessible by, but not necessarily a part of, the computing device 1300. For example, the storage 1316 may be accessed by the computing device 1300 over a network.

The I/O interfaces 1320 may include interfaces designed to communicate with peripheral hardware, e.g., print head 712, navigation sensors 738, optical imaging sensors 746, etc., and/or remote devices, e.g., other devices 720.

In various embodiments, computing device 1300 may have more or less elements and/or different architectures.

All of the discussion above, regardless of the particular implementation being described, is exemplary in nature, rather than limiting. Although specific components of the devices are described, methods, systems, and articles of manufacture consistent with the devices (e.g., 102 and 700) may include additional or different components. For example, components of the devices 102 and 700, host 116, and image source 720 may be implemented by one or more of: control logic, hardware, a microprocessor, microcontroller, application specific integrated circuit (ASIC), discrete logic, or a combination of circuits and/or logic. Further, although selected aspects, features, or components of the implementations are depicted as hardware or software, all or part of the systems and methods consistent with the devices 102 and 700, host 116, and image source 720 may be stored on, distributed across, or read from machine-readable media, for example, secondary storage devices such as hard disks, floppy disks, and CD-ROMs; a signal received from a network; or other forms of ROM or RAM either currently known or later developed. Any act or combination of acts may be stored as instructions in computer readable storage medium. Memories may be DRAM, SRAM, Flash or any other type of memory. Programs may be parts of a single program, separate programs, or distributed across several memories and processors.

The processing capability of the system may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs and rule sets may be parts of a single program or rule set, separate programs or rule sets, or distributed across several memories and processors.

It is intended that the foregoing detailed description be understood as an illustration of selected forms that the invention can take and not as a definition of the invention. It is only the following claims, including all equivalents, that are intended to define the scope of this invention.

We claim:

1. A printer, comprising:
 a scanner configured to scan a document including updates and configured to generate update data from the document;
 a position module configured to determine position data of the printer in response to movement of the printer on a copy of the document, wherein the position data includes a location and an orientation of the printer; and
 a processor configured to generate print data based on the update data and configured to communicate the print data to selectively print the updates at correct locations on the copy of the document according to the position data.

2. The printer of claim 1, further comprising:
 a database configured to store the update data, wherein the processor is configured to access the database for the update data according to the position data.

3. The printer of claim 1, further comprising:
 a print mechanism configured to receive the print data from the processor and configured to deposit ink according to the print data.

4. The printer of claim 3, wherein the print mechanism comprises a plurality of print nozzles.

5. The printer of claim 4, wherein the scanner is positioned between at least two of the plurality of print nozzles.

6. The printer of claim 1, further comprising:
 a wireless interface configured to communicate with a host to receive the update data.

7. The printer of claim 1, wherein the updates include information added to the document comprising instructions, remarks, annotations, or notes.

8. The printer of claim 1 wherein the position module comprises:
 a movement module configured to generate movement data in response to movement of the printer, the movement data indicative of the location and the orientation of the printer relative to an origin and an initial orientation;
 a first motion sensor and a second motion sensor configured to communicate motion signals to the movement module in response to movement of the printer; and
 a position module processor configured to determine the position data based on the movement data.

9. The printer of claim 8, wherein the movement data is based on an angle between a first line and a second line, wherein the first line is defined by the first motion sensor and the second motion sensor at the origin and the initial orientation, and wherein the second line is defined by the first motion sensor and the second motion sensor at the location and the orientation of the printer.

10. A method comprising:
 generating update data from updates to a document;
 determining position data in response to movement of a printer on a copy of the document, wherein the position data includes a location and an orientation of the printer;
 selecting print data based on the update data and the position data; and
 communicating the print data to selectively print the updates at correct locations on the copy of the document according to the position data.

11. The method of claim 10, further comprising:
 storing the update data in a database; and
 accessing the update data from the database according to the position data.

12. The method of claim 10, further comprising:
 scanning the document with a scan head mounted on the printer.

13. The method of claim 12, further comprising:
 depositing a marking particle from a print head to the copy of the document according to the print data.

14. The method of claim 13, wherein the print head comprises an array of print nozzles.

15. The method of claim 14, wherein the scan head is positioned within the array of print nozzles.

16. The method of claim 10, further comprising:
generating movement data in response to movement of the printer, the movement data indicative of the location and the orientation of the printer relative to an origin and an initial orientation;
communicating motion signals to a movement module in response to movement of the printer; and
determining the position data based on the movement data.

17. A computer readable storage medium having processor executable instructions configured to:
generate update data from a document;
determine position data in response to movement of a printer on a copy of the document, wherein the position data includes a location and an orientation of the printer;
receive print data based on the position data and the update data corresponding to updates made to the document; and
communicate the print data to selectively print the update data at correct locations on the copy of the document according to the position data.

18. The computer readable storage medium of claim 17, the instructions further configured to:
store the update data in a database; and
access the update data from the database according to the position data.

19. The computer readable storage medium of claim 17, to instructions further configured to:
initiate scanning the document with a scan head mounted on the printer; and
initiate deposit of a marking particle from a print head to the copy of the document according to the print data.

20. The computer readable storage medium of claim 19, wherein the print head comprises an array of print nozzles and the scan head is positioned within the array of print nozzles.

* * * * *